United States Patent
Skrinjar

(10) Patent No.: US 6,555,071 B2
(45) Date of Patent: Apr. 29, 2003

(54) WATER TREATMENT APPARATUS

(75) Inventor: Terence John Skrinjar, Toowoomba (AU)

(73) Assignee: Q-Tech Laboratories PTY, Ltd. (AU)

( * ) Notice: Subject to any disclaimer, the term of this patent is extended or adjusted under 35 U.S.C. 154(b) by 0 days.

(21) Appl. No.: 09/926,647

(22) PCT Filed: Aug. 31, 2001

(86) PCT No.: PCT/AU01/01096
§ 371 (c)(1),
(2), (4) Date: Nov. 28, 2001

(87) PCT Pub. No.: WO02/18277
PCT Pub. Date: Mar. 7, 2002

(65) Prior Publication Data
US 2003/0042210 A1 Mar. 6, 2003

(51) Int. Cl.⁷ .................................................. B01J 19/08
(52) U.S. Cl. ....................................................... 422/186
(58) Field of Search ......................... 422/186; 210/748; 204/157.15

(56) References Cited

U.S. PATENT DOCUMENTS 4,396,865 A  * 8/1983  Britt et al. ..................... 315/36

FOREIGN PATENT DOCUMENTS

| EP | 336346 | 10/1989 |
|----|--------|---------|
| EP | 801031 | 10/1997 |

OTHER PUBLICATIONS

Derwent Abstract Accession No. 2000–282242/2, RU2127229–C1 (Yurovskii) Mar. 10, 1999.

* cited by examiner

*Primary Examiner*—Edna Wong
(74) *Attorney, Agent, or Firm*—Hoffman, Wasson & Gitler PC

(57) ABSTRACT

An apparatus for generating an electromagnetic field in water. The apparatus comprises a set of spaced electrically conductive rings, which are respectively positively charged (rings 2, 6) and negatively charged (rings 3, 5). The rings are on a common axis between a negative plate (1) and a positive plate (7) and have precise spacings and dimensions. A central neutral ring (4) separates the pairs of rings. The electromagnetic field generated is such as to produce increases in the organic electrolytic functionality of living cellular material which is contacted with the water.

18 Claims, 6 Drawing Sheets

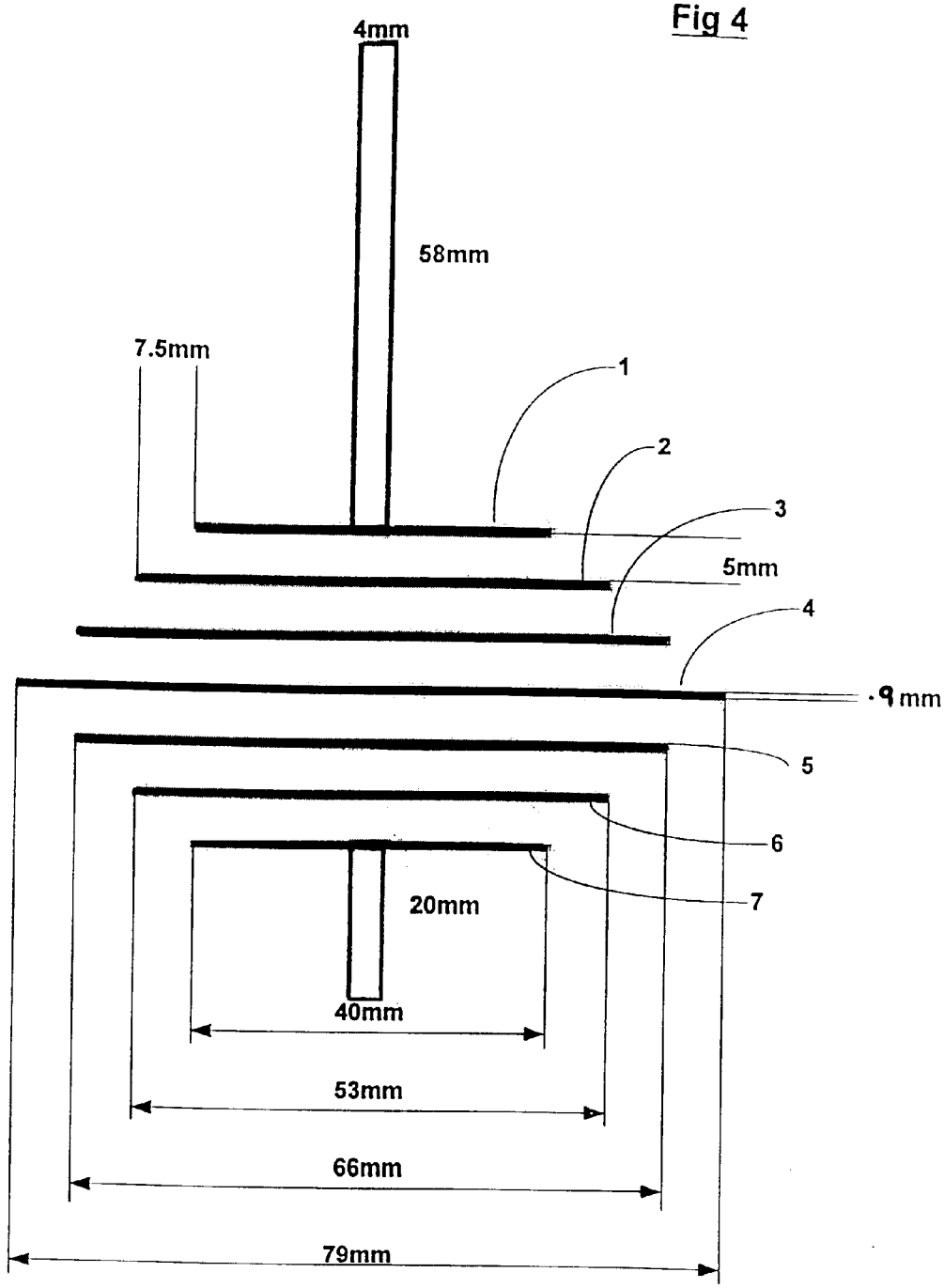

WATER TREATMENT APPARATUS

BACKGROUND OF THE INVENTION

This invention relates to water conditioning apparatus and is particularly concerned with apparatus which generates a specific electromagnetic signature in water that is similar to that of living cellular material.

OBJECT OF THE INVENTION

The object of the invention is to be able to treat water to make it particularly suitable for use with biological living cellular material and, generally, for use in situations such as agriculture, hydroponics and therapeutics where enhanced conductivity and increased water tension within the water enables increased beneficial organic electrolytic functionality. The expression "organic electrolytic functionality" refers to the quantity and availability of ions within living cellular material.

SUMMARY OF THE INVENTION

According to the present invention there is provided apparatus for generating an electromagnetic field in water comprising a set of spaced electrically conductive rings arranged on a common axis between two electronically conductive plates, wherein the number and spacing of the rings, and the charge applied to the plates and rings is selected so that the water in which the electromagnetic field is induced increases the organic electrolytic functionality of living cellular material which is contacted with the water.

DETAILED DESCRIPTION OF THE INVENTION

The electrically conductive rings are suitably arranged in a substantially spherical array parallel to one another and can be formed from stainless steel or like material, with a central ring being formed from a different material such as copper. Apart from the central ring which has a neutral potential, the remaining adjacent rings have opposing potentials applied to them by way of suitable conductive tracks.

Preferably, there are five electrically conductive rings and two electrically conductive plates which define the spherical array. The middle neutral ring has the largest diameter and the remaining rings decrease in diameter by pre-determined amounts and in paired sets of the same diameter. For instance, the copper ring can have a diameter of 79 mm and this will set the diameters of the remaining pairs of rings at 66 mm, 53 mm and 40 mm, with spacings between the rings of 5 mm.

The non-conductive support housing for the rings suitably comprises an acrylic housing comprising a series of two dimensional laser cut objects which is designed to allow the rings to be held firmly without interfering with the magnetic fields generated inside the rind assemble itself. Multiple arrays of such housings are also possible.

The non-conductive support housing can be arranged within an orbital covering to protect the apparatus from possible damage due to mishandling or accidents. This covering can be made from shock resistant material such as ABS plastics material or the like.

The apparatus is preferably powered with a 110–220 volt AC to 30 volt DC transformer which supplies the appropriate potential between the rings. The power apply is designed to produce the required clean power for optimal effectiveness for the particular configuration of rings.

BRIEF DESCRIPTION OF THE DRAWINGS

FIG. 4 shows the relative positioning of the discs in the apparatus of FIG. 1.

DESCRIPTION OF PREFERRED EMBODIMENTS

Figure 1:
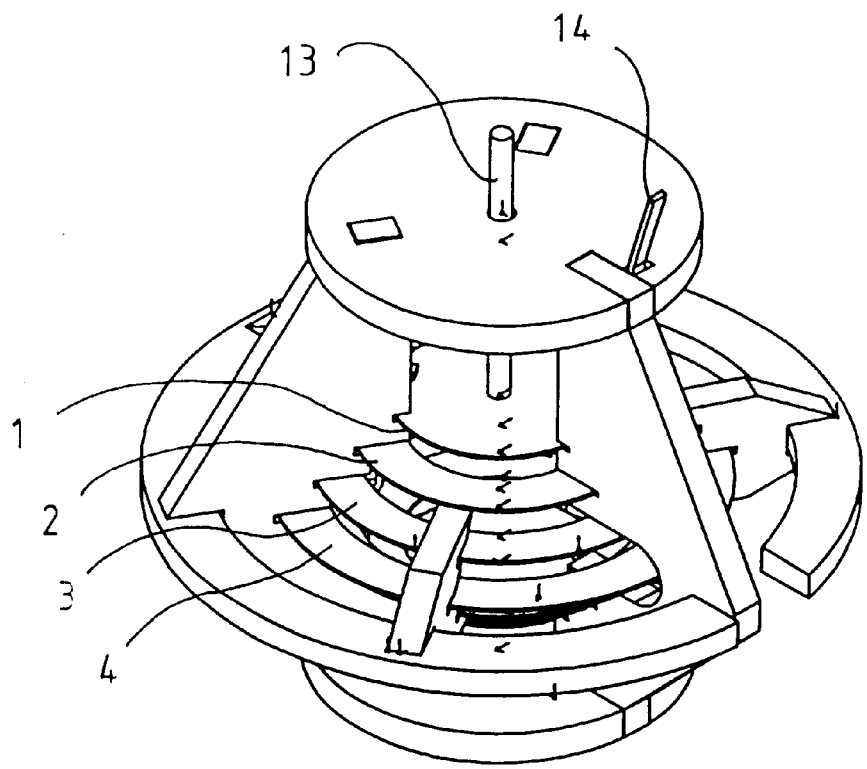
FIG. 1 is a side perspective view of the apparatus according to the present invention.

Preferred embodiment of the invention will now be described with reference to the drawings, in all of which like reference numeral refer to like parts.

Figure 2:
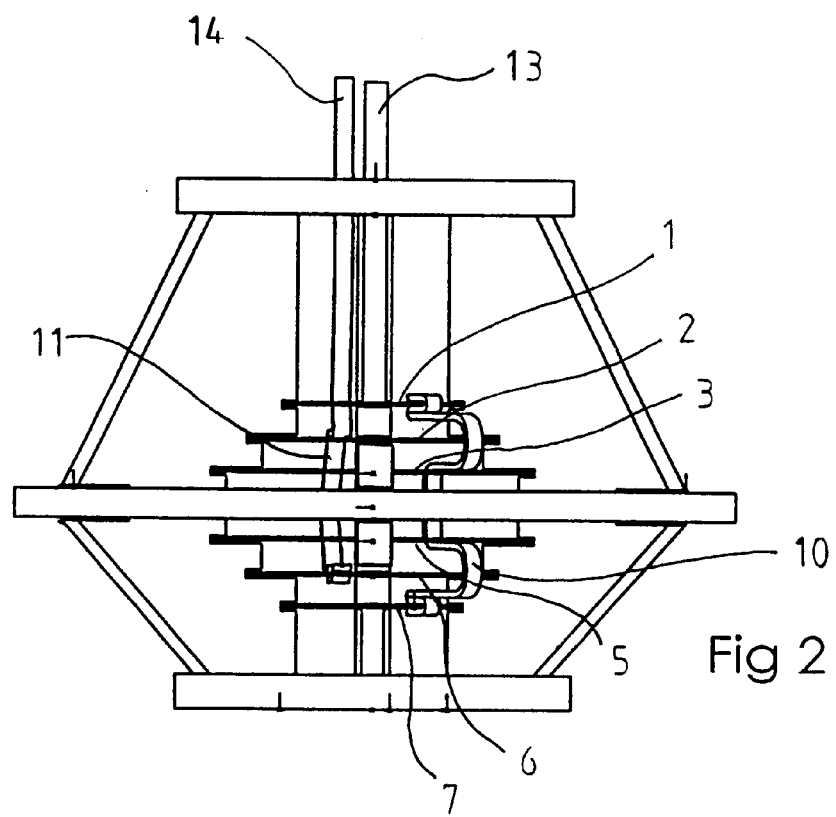
FIG. 2 is a side cross-sectional view of the apparatus shown in FIG. 1.
Figure 3:
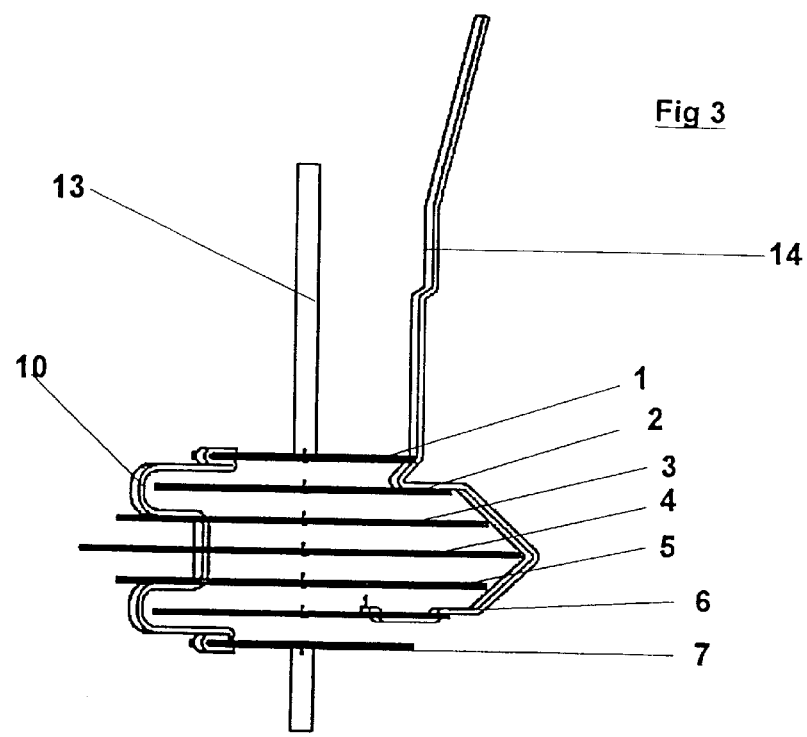
FIG. 3 is a side cross-sectional view of the discs and connecting electrodes of the apparatus of FIG. 1.

Referring firstly to FIGS. 1–5, the apparatus comprises five coaxially arranged rings 2–6 between two electrically conductive, plates 1, 7. Rings 2, 3 and 5, 6 are 1.2 mm discs formed from specific stainless steel and ring 4 is formed from copper. The rings have the dimensions and configurations illustrated in FIGS. 4 and 5. Plate 1 and rings 3, 5 and 7 are connected to a negatively charged track 10, and plate 7, and rings 2 and 6 are connected to a positively charged track 11 as illustrated in FIGS. 2 and 3.

Figure 5:
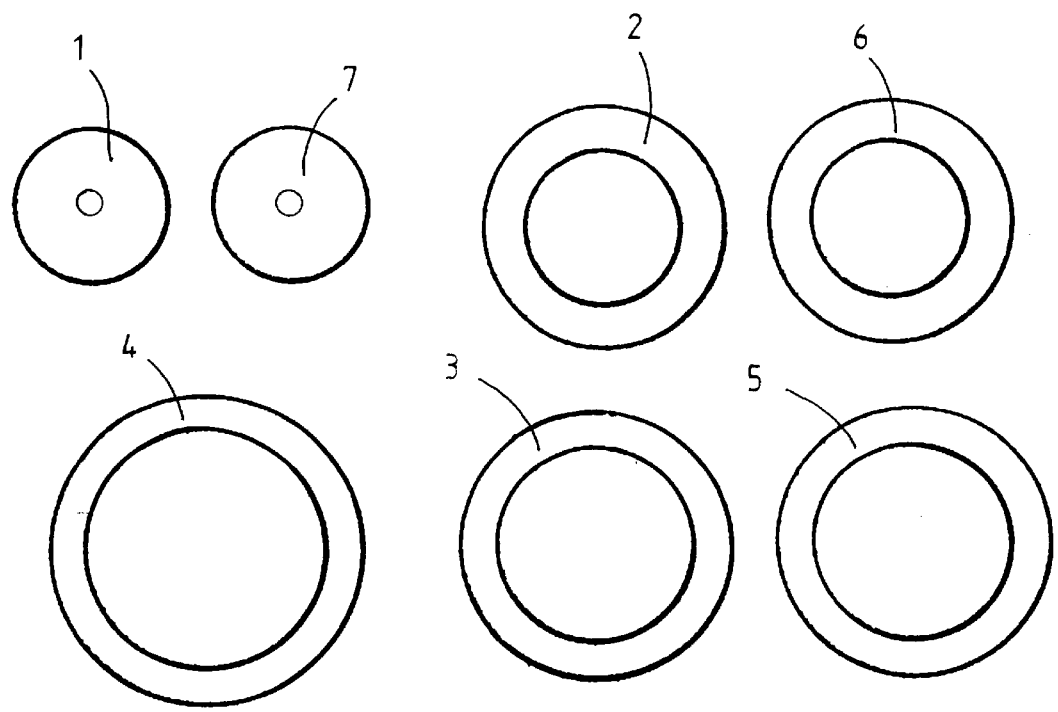
FIG. 5 shows the separate components of the apparatus of FIG. 3.

The plates and rings are supported within a clear acrylic housing into which respective conductors 13 and 14 extend. The other components illustrated in FIG. 5 are components of the housing.

Figure 6:
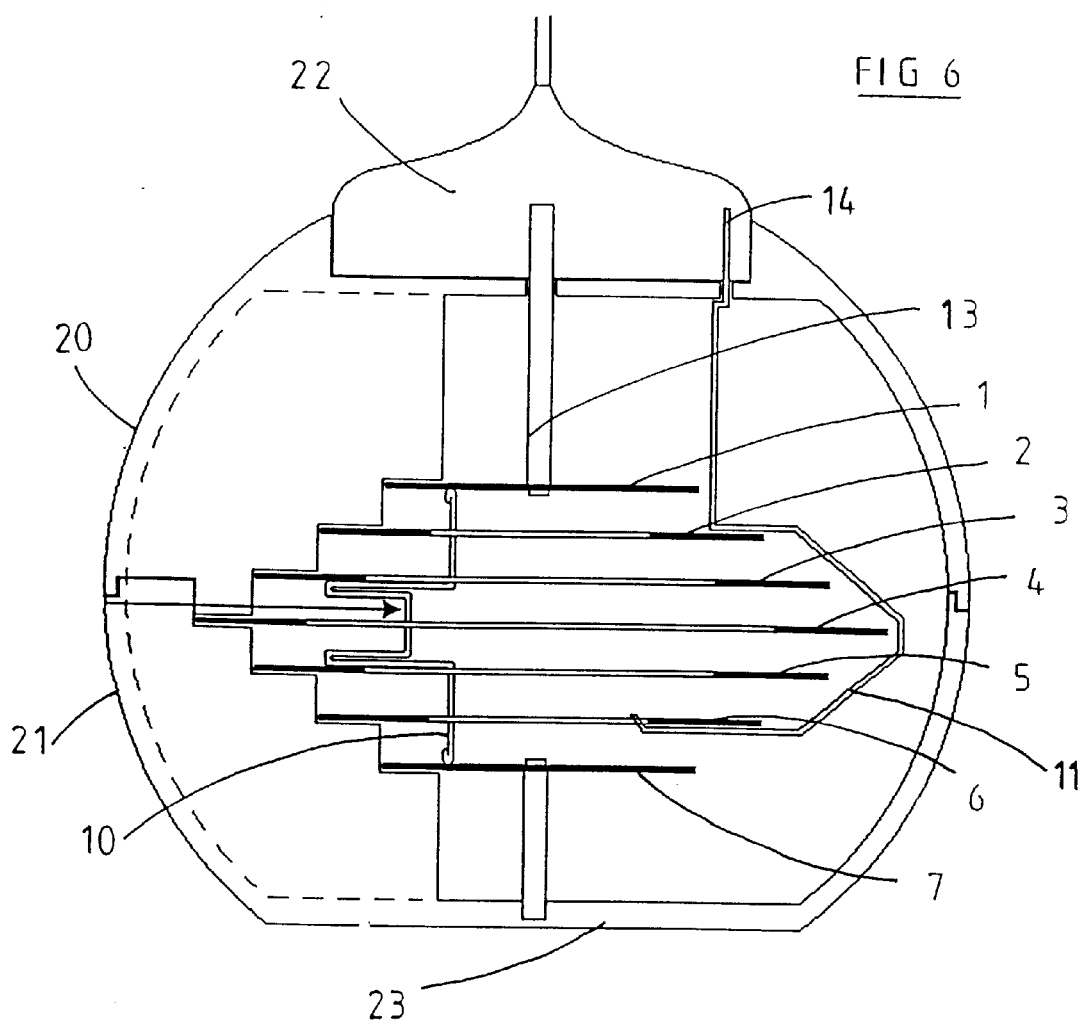
FIG. 6 is a cross-sectional line drawing of an apparatus according to another aspect of the present invention.
Figure 7:
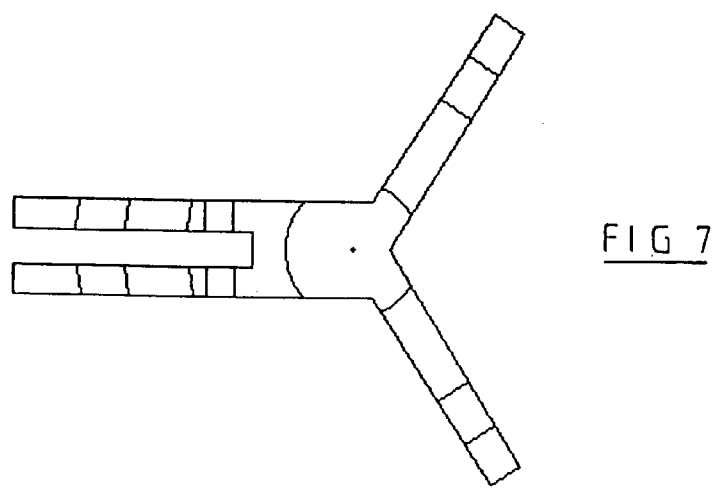
FIG. 7 is a support brace for the central region of the apparatus shown in FIG. 6.

Referring to FIGS. 6 and 7, the covering consists of three main parts—viz a top hemisphere 20, a bottom hemisphere 21 and a cable cap 22. The covering has a substantially overall spherical configuration with the bottom hemisphere 21 including a flat base 23 to stabilize and keep the unit level in the water. The top hemisphere locks 20 onto the bottom hemisphere 21 by means of a slip twist lock arrangement.

The cap 22 is connected to the housing (not shown) of the apparatus and includes a water-tight seal and entry ports for the negative brass track 13 and the positive track 14.

Figure 8:
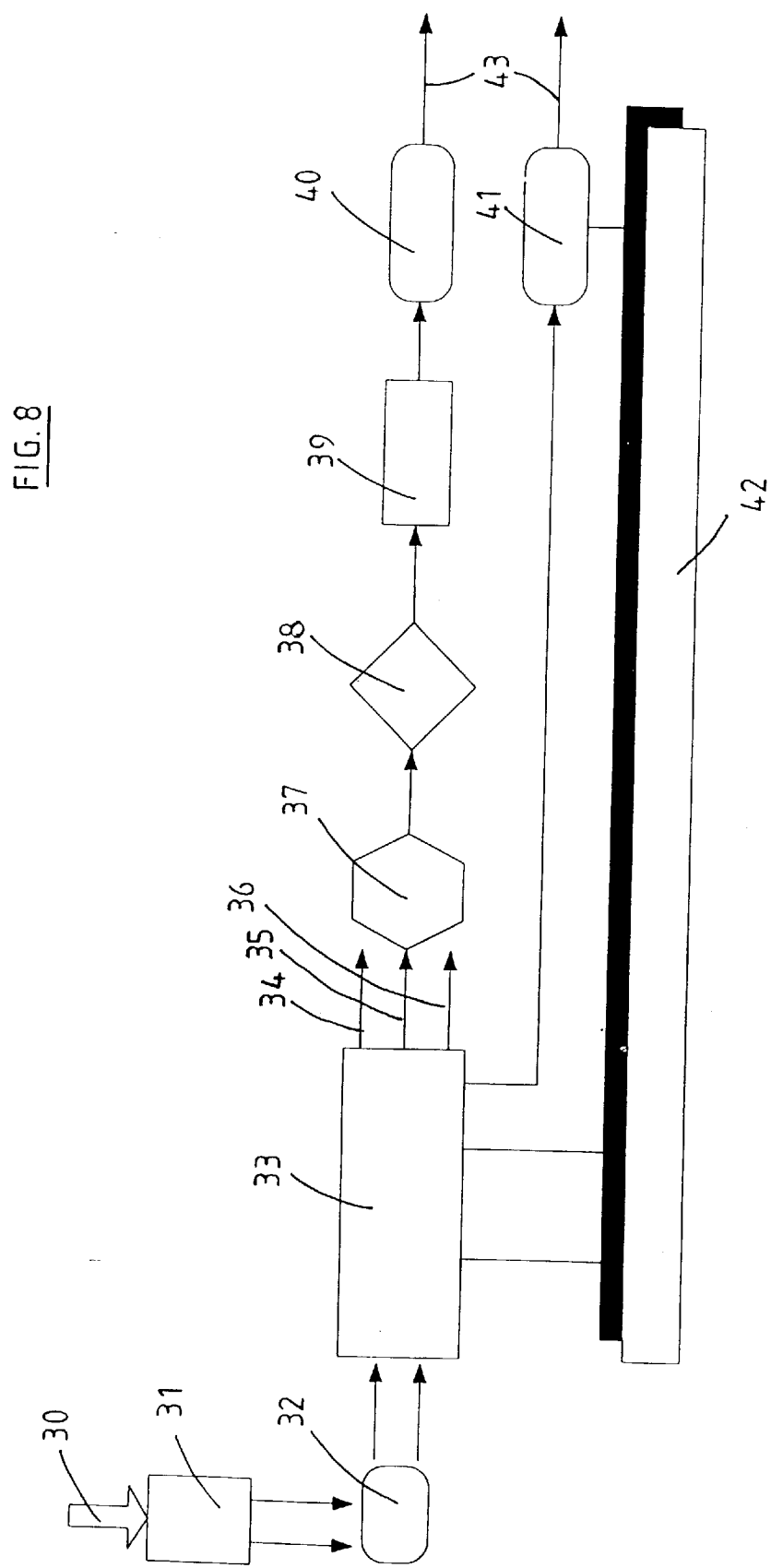
FIG. 8 is a block diagram of a power supply for use with apparatus according to the present invention.

A suitable power supply system for a hydro-therapy system is shown in FIG. 8. This comprises a double pole main power source 30; power switch 31; fuses 32 on active and neutral; 100 VA Transformer 33 with three taps 34, 35, 36 to select power required; rotary switch power selector 37; full bridge rectifier 38; single capacitor filter 39; 3 amp circuit breaker 40; small current sense resistor 41; 10 LED element displayer 42 to display amplified voltage read across current sense resistor 41; and conditioned power output 43.

Figure 9:
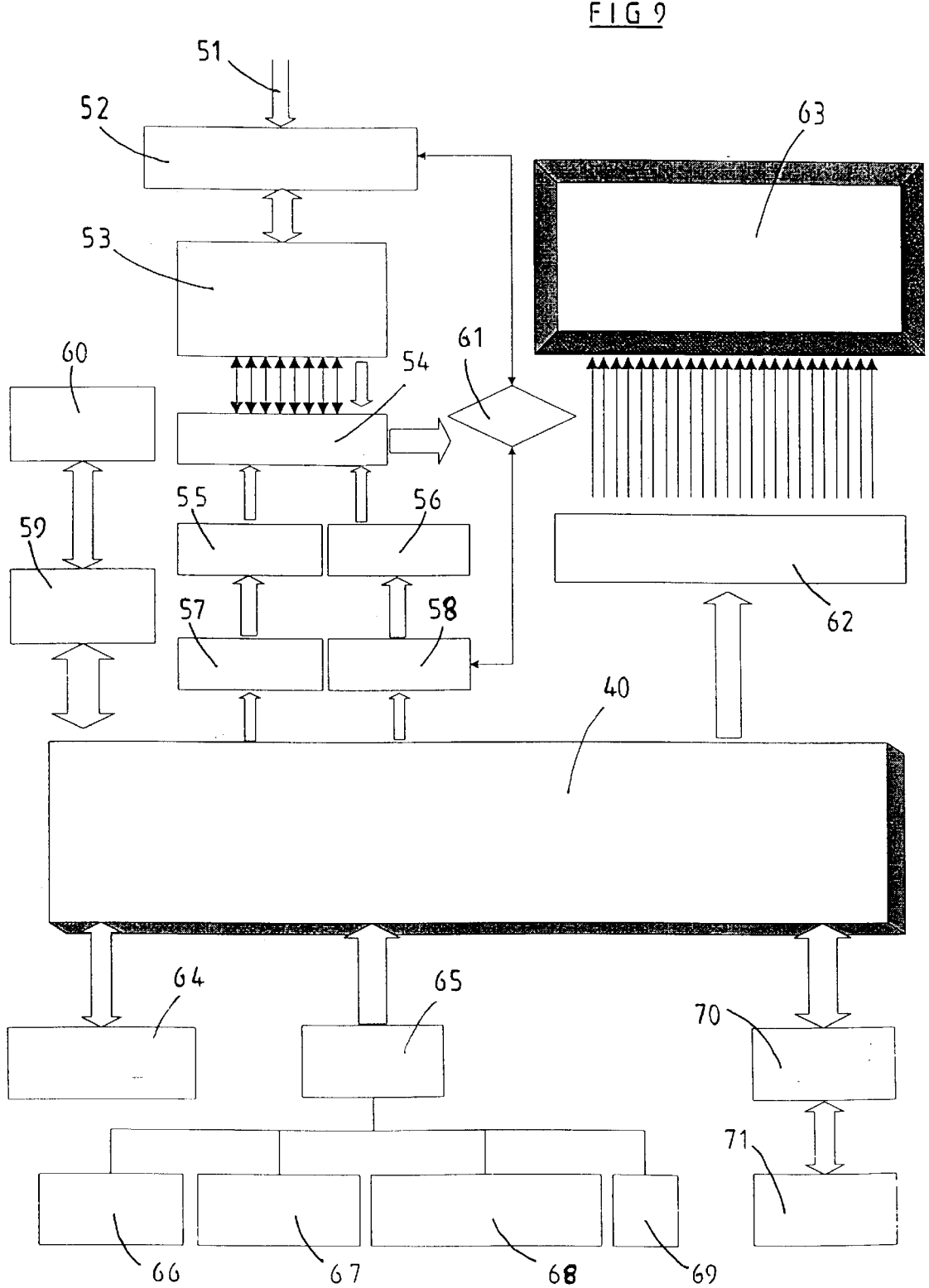
FIG. 9 is a block diagram of an advanced power supply for use with apparatus according to the present invention.

An advanced talking power supply unit block diagram is shown in FIG. 9. The unit enables full control of the apparatus by the use of a microprocessor (not shown). The following integers are identified in the drawing:

51: power input (230, 220, 115, 110 or 100 v)
52: voltage selection relay
53: transformer
54: tap relays
55,56: transistor arrays
57,58: latches
59: speech generator 60: speaker
61: transistor
62: LCD driver
63: LCD display
64: key membrane
65: A/D convertor, 8 port, internal
66: power supply, voltage readings
67: temperature sensor
68: security detector, mechanical
69: reference
70: IR modulator
71: IR conms The unit has the following characteristics: Built in attenuation, through providing power at different levels, to cater for different water qualities around the world.

Built in programmable timer. The unit will turn itself off when time expires.

Built in speech. i.e. the unit will inform the user as required in appropriate language.

Built in Self Diagnostics
  Sense array voltage and currents
  Sense voltages in various parts of the circuits in order to verify function
  Check Mains Power Voltages and adjust accordingly
  Step through the checking of the array and connections if problems occur (User help).

LCD (Standard Watch Type) display, with the Power level indicator, Timer, voltage and currents and other relevant information to be displayed as required.

Built in Flash Memory Storage to record:
  Model No
  Serial No
  Date Completed
  Number of times used
  Total time used
  Possibly the internal temperature of the unit
  Diagnostic information.

Built in Infra-Red Serial Communications to communicate directly with a Computer for diagnostic purposes, for programming and other information. Distance of communication about 20 cm.

Re-Programmable.
  The unit will be re-programmable through the serial Infra-Red communications Fully Automatic.
  The unit will be fully automatic, from auto selecting the power levels and standard timer settings to the self diagnostics.

Security. Self Protection with internal booby traps causing an internal operating program erasure, should the case be cracked opened, voiding warranty.

The operation of the power supply is done using a key membrane with appropriate labelling to aid the user.

Licensed code to disarm and service, possible date dependant, changing algorithm.

The apparatus herein described can be used in agricultural, therapeutic and water treatment industries primarily as an energising and/or revitalizing system for water.

The term "comprise", or variations of the term such as "comprises" or "comprising", is used herein to denote the inclusion of a stated integer or stated integers but not to exclude any other integer or any other integers, unless in the context or usage an exclusive interpretation of the term is required.

Whilst the above has been given by way of illustrative example of the invention, many modifications and variations may be made thereto by persons skilled in the art without departing from the broad scope and ambit of the invention as herein set forth.

We claim:

1. Apparatus for generating an electromagnetic field in water comprising a set of spaced electrically conductive rings arranged on a common axis between two electrically charged plates, wherein the number and spacing of the rings, and the charge applied to the plates and rings is selected so that the water in which the electromagnetic field is induced increases the organic electrolytic functionality of living cellular material which is contacted with the water, wherein there is a total of five electrically conductive rings of planar configuration, said electrically conductive rings comprising three sub-sets, the first of which sub-sets consists of two rings of equal diameter, the second of which sub-sets consists of two rings of equal but larger diameter than the rings in the first sub-set, and the third of which sub-sets comprises a ring of larger diameter than the rings in the second sub-set; and wherein the ring of the third sub-set is interposed between the rings of the second sub-set which are in turn interposed between the rings of the first sub-set.

2. Apparatus as claimed in claim 1, wherein the rings are equally spaced from one another.

3. Apparatus as claimed in claim 2, wherein the rings are spaced 5 mm from one another.

4. Apparatus as claimed in claim 3, wherein the exterior diameter of the first sub-set of rings is 53 mm, the exterior diameter of the second sub-set of rings is 66 mm and the exterior diameter of the ring of the third sub-set is 79 mm.

5. Apparatus as claimed in claim 4, wherein the first and second sub-sets of rings are fabricated from stainless steel and the ring of the third sub-set is fabricated from copper.

6. Apparatus as claimed in claim 5, wherein the first sub-set of rings is positively charged, the second sub-set of rings is negatively charged, and the ring of the third sub-set has a neutral charge.

7. Apparatus as claimed in claim 6, wherein a common copper conductive linkage is formed between the second sub-set of rings and the electrically charged plates.

8. Apparatus as claimed in claim 7, wherein brass rods extend from the axis of the electrically charged plates.

9. Apparatus as claimed in claim 8, wherein one of the brass rods is connected to an external power supply.

10. Apparatus as claimed in claim 9, wherein the brass rod connected to the external power supply has a diameter of 4 mm and a length of 58 mm, and the other of the brass rods has a diameter of 4 mm and a length of 20 mm.

11. Apparatus as claimed in claim 10, wherein a common stainless steel conductive linkage is formed between the first sub-set of rings and to the external power supply.

12. Apparatus as claimed in claim 1, wherein the electrically charged plates have planar circular disc shapes.

13. Apparatus as claimed in claim 12, wherein the electrically charged plates are arranged parallel to and coaxial with the electrically conductive rings.

14. Apparatus as claimed in claim 13, wherein the electrically charged plates are spaced 5 mm from the adjacent electrically conductive rings.

15. Apparatus as claimed in claim 14, wherein the electrically charged plates are 40 mm in diameter.

16. Apparatus as claimed in claim 1, which is supported with a housing comprising a non-conductive ring support material through which water can passage.

17. Apparatus as claimed in claim 16, wherein the electrically charged plates are negatively charged.

18. Apparatus as claimed in claim 16, wherein the housing in arranged within an orbital shaped covering to protect the apparatus from damage.

* * * * *

UNITED STATES PATENT AND TRADEMARK OFFICE
CERTIFICATE OF CORRECTION

PATENT NO. : 6,555,071 B2  
DATED : April 29, 2003  
INVENTOR(S) : Terence J. Skrinjar It is certified that error appears in the above-identified patent and that said Letters Patent is hereby corrected as shown below:

The application claims its earliest priority from Australian Provisional Patent Application Serial No. PQ 9894, filed September 1, 2000.

Signed and Sealed this

Thirteenth Day of January, 2004

JON W. DUDAS  
*Acting Director of the United States Patent and Trademark Office*